United States Patent [19]
Rothlisberger et al.

[11] 3,978,522
[45] Aug. 31, 1976

[54] METHOD AND APPARATUS FOR MOUNTING A CASSETTE RECORD-PLAYBACK HEAD

[75] Inventors: Kurt Rothlisberger, Morton Groove; Richard F. Vee, Chicago, both of Ill.

[73] Assignee: Teletype Corporation, Skokie, Ill.

[22] Filed: Oct. 6, 1975

[21] Appl. No.: 619,764

Related U.S. Application Data

[63] Continuation of Ser. No. 479,679, June 14, 1974, abandoned.

[52] U.S. Cl. ............................... 360/104; 360/105; 360/109
[51] Int. Cl.² ..................... G11B 5/48; G11B 21/24; G11B 5/54; G11B 5/56
[58] Field of Search ............. 360/104, 105, 109, 96

[56] References Cited
UNITED STATES PATENTS

| | | | |
|---|---|---|---|
| 2,912,519 | 11/1959 | Simmons | 360/105 |
| 3,196,215 | 7/1965 | Casey et al. | 360/104 |
| 3,586,356 | 6/1971 | Smalarz | 360/104 |
| 3,684,295 | 8/1972 | Strain et al. | 360/105 |
| 3,729,202 | 4/1973 | Wakabayashi | 360/105 |

*Primary Examiner*—Robert S. Tupper
*Attorney, Agent, or Firm*—W. K. Serp; J. L. Landis

[57] ABSTRACT

An apparatus and method for accurately locating a record-playback head with respect to a tape carried within a conventional tape cassette. The cassette is oriented within a cradle by means of a pair of parallel guide pins which engage the alignment openings of the cassette. A playback-record head is mounted upon a mounting clip which defines a U in cross-section having a record-playback head mounting leg and an alignment leg. The alignment leg defines two alignment surfaces which cooperate with the guide pins to accurately position the clip and the record-playback head carried thereon with respect to the cradle and a cassette carried therein.

7 Claims, 5 Drawing Figures

U.S. Patent  Aug. 31, 1976  3,978,522
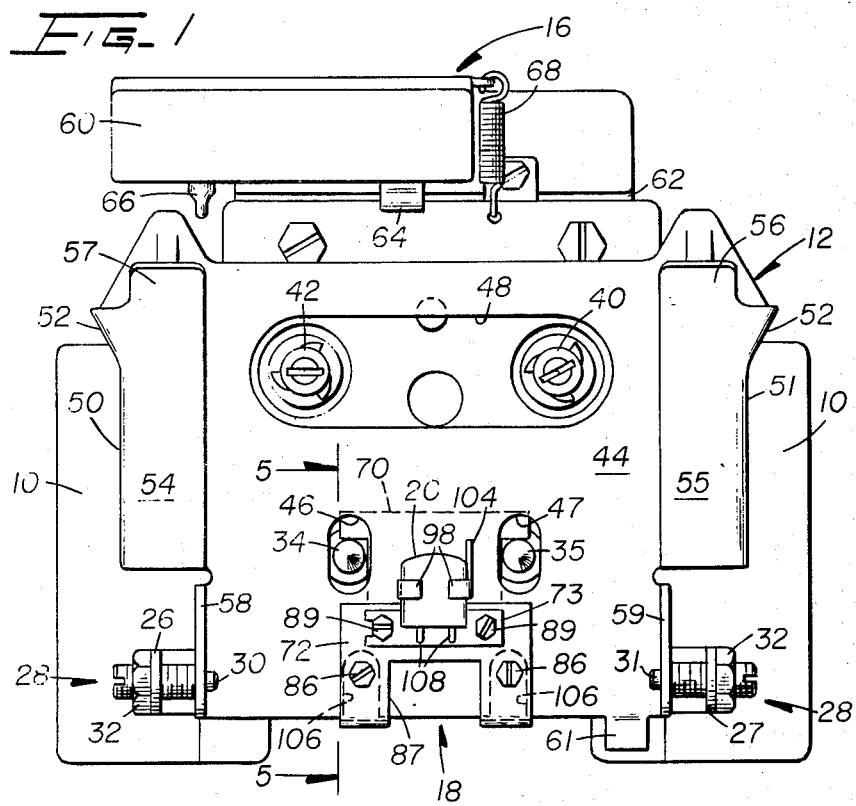
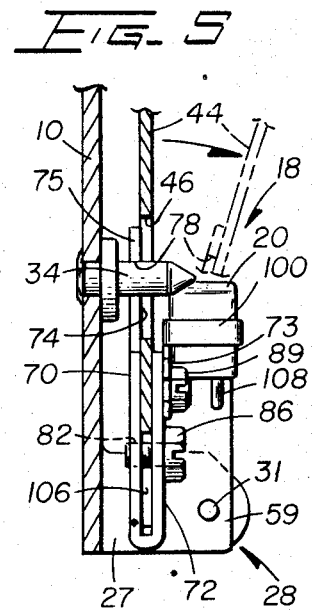
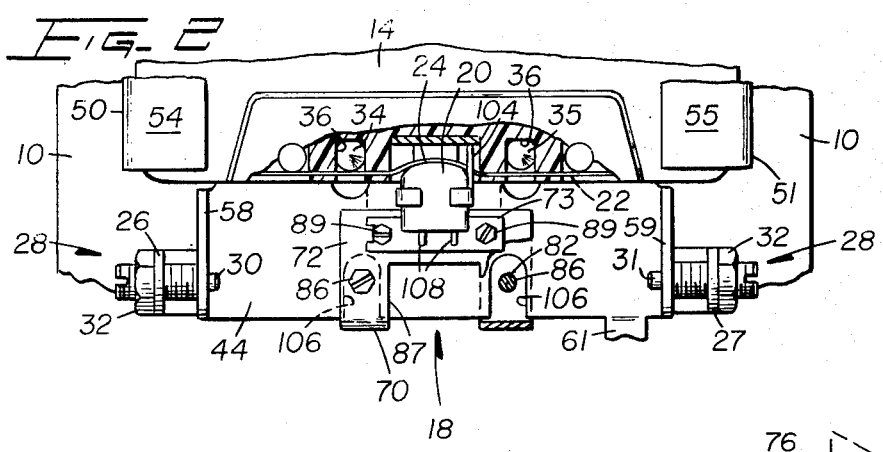
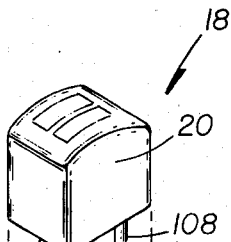
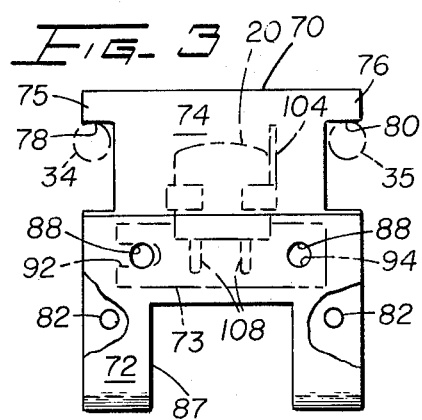
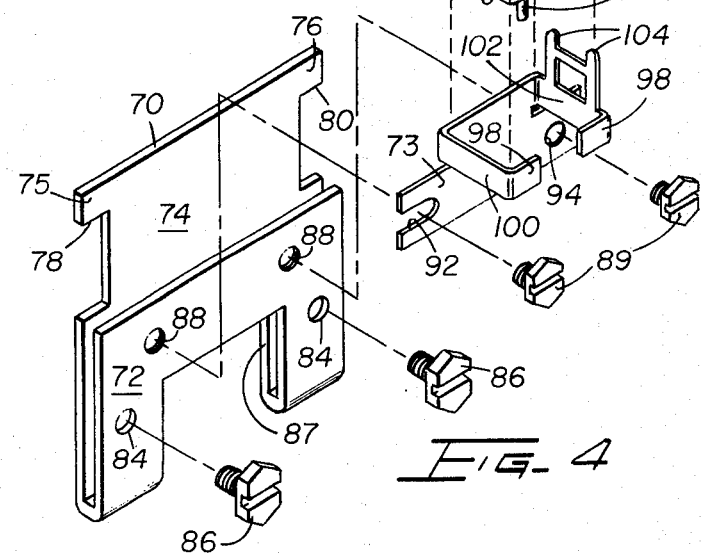

METHOD AND APPARATUS FOR MOUNTING A CASSETTE RECORD-PLAYBACK HEAD

This is a continuation of application Ser. No. 479,679 filed June 14, 1974, now abandoned.

BACKGROUND OF THE INVENTION

This invention relates to a method and apparatus for mounting a record-playback head with respect to an information tape carried in a tape cassette and more particularly relates to a mounting arrangement for a record-playback head which facilitates rapid and accurate orientation of the head with respect to the tape.

Various media have been suggested and used for recording digital information. A particular medium finding increased usage is a tape cassette. Digital cassettes are similar in construction to audio cassettes which have enjoyed increasing commercial acceptance over the past ten years. The construction and operational features of such digital cassettes are akin to the audio types with the additional consideration that much higher mechanical and electrical standards are maintained. The information density upon the tape and the speed at which the tape is drawn across the record-playback (R/P) head necessitates the maintenance of close physical tolerances between the tape and the R/P head at the record-playback station of the cassette. Several arrangements have been suggested and used to orient the R/P head with respect to the tape carried within the cassette. Frequently, the head is mounted upon a bracket having elongated mounting holes and the bracket is fastened to the recorder. Final positioning of the R/P head with respect to the cassette is accomplished by sliding the bracket in the mounting holes until proper orientation is attained. Sophisticated instrumentation is used during installation to obtain proper head alignment. Once alignment is obtained, the screws are tightened and lacquered to obtain a secure head mounting. This procedure generally requires that adjustment or installation of a record-playback head be accomplished by skilled, factory trained personnel. Consequently, such precise, and critical head alignment has, in the past, resulted in a rather costly field installation procedure.

The illustrated embodiment provides a unique and improved means for installing and orienting a playback-record head with respect to the tape carried in a cassette which permits field installation by relatively untrained personnel.

SUMMARY

Disclosed is an apparatus for accurately positioning a record-playback head with respect to an information-tape carried within a tape cassette. The cassette is accurately positioned within a cassette recorder by means of at least one guide member. Mounting means are included for securely retaining the record-playback head in a fixed, predetermined location on the recorder. The mounting means includes alignment means for cooperation with the guide member which serves to accurately position the R/P head with respect to the guide member. In this manner, alignment between the R/P head and a cassette, positioned with respect to the guide member, at the record-playback station of the cassette is obtained.

More particularly, the cassette recorder includes a pair of spatially oriented axially parallel guide pins which serve to accurately position a cassette within the recorder. The alignment means further includes a pair of reference surfaces each of which serves to engage one of said pins. In this way, the R/P head carried by the mounting means is oriented with respect to the guide pins and with respect to the tape within a cassette oriented with respect to the guide pins.

BRIEF DESCRIPTION OF THE DRAWINGS

FIG. 1 is a front view of an apparatus embodying certain features of this invention.

FIG. 2 is a fragmented, sectional view of a portion of the apparatus of FIG. 1 illustrating the cooperation of a component thereof with a conventional tape cassette.

FIG. 3 is an enlarged front view of a component of the apparatus with a portion thereof illustrated in phantom.

FIG. 4 is an exploded view of the component illustrated in FIG. 3; and

FIG. 5 is a left end fragmentary, sectional view of the apparatus of FIG. 1 taken along the line 5—5 illustrating, in phantom, an alternate position of a component thereof.

DESCRIPTION OF THE ILLUSTRATED EMBODIMENT

General

With particular reference to FIG. 1, the apparatus includes a support assembly 10 carrying a cradle 12 pivotally mounted thereto. The cradle 12 defines a cavity adapted for receipt of a tape cassette 14. Mounted to the support assembly 10 and biased for engagement with the upwardly disposed edges of the cassette 14 is a cassette latching mechanism 16. A record-playback (R/P) head assembly 18 is secured to the lower edge of the rear wall of the cradle 12 and positioned so that the upwardly disposed surface of a record-playback head 20 accurately engages an informational tape 22 carried by the cassette 14 at a record-playback station 24 of the cassette 14 as will hereinafter be further described. For a more detailed description of the support assembly, cradle, and latching mechanisms, the reader's attention is directed to U.S. Pat. application, by K. Rothlisberger-R. F. Vee, entitled "Apparatus and Method for Positioning A Tape Cassette" filed simultaneously herewith and incorporated by reference.

Cradle

As mentioned, the cradle 12 is pivotally mounted to the forward surface of the support assembly 10. Serving to provide relative arcuate pivotal movement between the cradle 12 and the support assembly 10, the lower end of the assembly 10 defines a pair of outwardly projecting brackets 26 and 27 which form a portion of a cradle support hinge 28. The outwardly disposed ends of each of the brackets 26 and 27 are drilled to receive a pair of coaxial threaded cradle support hinge pins 30 and 31 the ends of which are opposingly positioned to engage mating openings forward in the cradle as will subsequently be described. Serving to prevent vibration movement of the hinge pins are lock nuts 32 which are threaded about the pins 30 and 31 and tightened against the outwardly disposed surfaces of the respective cradle support brackets 26 and 27.

Serving to guide and position a cassette within the cradle are a pair of spatially positioned forwardly projecting guide members in the form of cassette guide pins 34 and 35 which are secured to the forwardly disposed surface of the cradle support assembly 10 and project towards the cradle 12. The ends of the pins 34 are conically shaped so as to engage alignment openings 36 of a conventional tape cassette thereby camming the cassette 14 into relative position with respect to the record-playback head 20. The pins 34 and 35 are located with reference to a selected record-playback head 20 location as determined by industry manufacturing standards respecting the dimensional parameters of a conventional tape cassette.

As mentioned, the cradle assembly 12 defines a cassette receiving cavity and includes a rear planar wall 44, the surface of which is oriented substantially normal to the axes of drive 40 and take-up 42 spindles when the cradle is in the operating position of FIG. 1. The rear wall 44 defines a pair of elongated spaced guide pin apertures 46 and 47 which are positioned to allow the guide pins 34 and 35 projecting from the surface of the support assembly 10 to pass therethrough. A third elongated spindle opening 48 is defined by the rear wall 44 of the cradle 12. The major axis of this opening is normal to the major axis of the guide pin apertures 46 and 47 and positioned to allow the take-up and drive spindles 40, 42 to pass freely therethrough as the cradle 12 is pivoted about the hinge 28. Additionally, the cradle 12 includes a pair of opposing side walls 50 and 51 having a shape conforming to that of a conventional tape cassette. The upwardly disposed ends of the side walls are flared outwardly as at 52 so that the opposing faces thereof define camming surfaces for guiding a cassette into the cavity defined by the cradle 12. A pair of partial, opposing front walls 54 and 55 extend respectively from the ends of the side walls 50 and 51 and lie in a plane parallel to the rear wall 44 of the cradle 12. The upwardly disposed ends of the front walls 54 and 55 respectively define guide tabs 56 and 57 which are also flared outwardly providing a pair of camming surfaces disposed towards the rear wall 44 of the cradle 12 which serve to cam a cassette, upon placement into the cavity, toward the rear wall thereof.

Serving to mount the cradle 12 for pivotal movement with respect to the support assembly 10, the cradle 12 is formed with a pair of forwardly disposed cradle hinge brackets 58 and 59 extending from the rear wall 44 of the cradle 12 and inwardly offset and having a plane substantially parallel to the plane of the side wall 50 of the cradle. Each of the brackets 58 and 59 defining a circular hole adapted to receive the end of respective hinge pins 30 and 31 thereby pivotally mounting the cradle 12 to the support assembly 10. When assembled as illustrated in FIG. 1, the hinge pins 30 and 31 are seated in mating openings defined by the brackets 58 and 59 and the cradle 12 is centered with respect to the guide pins 34, 35 and spindles 40, 42. The guide pins 34, 35 and the drive 40 and take-up 42 spindles are in registration with their respective openings so that they will freely pass through the wall 44 as the cradle is swung about the hinge assembly 28. The upwardly disposed edges of the hinge brackets 58, 59 define a cradle support surface which serves to limit downward cassette movement and roughly position the cassette within the cradle cavity prior to more precise positioning by the guide pins 34 and 35. Serving to limit pivotal movement of the cradle 12 with respect to the support frame is a cradle stop tab 61 which extends downwardly from the lower edge of the cradle wall 44 and projects angularly from the plane of the wall 44 towards the support assembly 10. The length and angle of deflection of the tab 61 is selected with respect to the location of the pivot axis of the hinge 28.

Securely holding the cassette 14 and cradle 12 in the opening position is the latching mechanism 16 supported on the support assembly 10 adjacent the upper end of the cradle 12. The latching mechanism 16 includes a U-shaped housing 60 resiliently supported on the support assembly 10 with the bite of the housing 60 downwardly disposed towards the upper end of the cradle 12. The rearwardly disposed leg of the housing is secured to the upwardly disposed end of a flat cantilevered spring 62 secured to the support assembly 10. As the spring 62 is flexed, the latch, carried by the housing 60 engages the upper edge of a cassette seated in the cavity of the cradle 12. Mounted within the housing 60 is an interlock switch 66 which is positioned for actuation by the upwardly disposed edge of a cassette. The switch 66 provides a control signal to suitable motor control circuitry (not shown) which indicates the presence of a cassette in the operating position. A coil spring 68 is secured to the center of the bite of the housing 60 to the support assembly biasing the latch 64 against the top of a cassette carried within the cradle 12.

Playback-Record Head Assembly

The playback head assembly 18 is located upon the rear wall 44 of the cradle 12 and, when the cradle 12 is swung to its operating position, a cassette is cammed by the guide pins passing through the guide apertures defined by the cassette body into accurate location with respect to the P/R head 20. With particular reference to FIGS. 3 and 4 the assembly 18 includes an alignment clip 70 having a U-shaped configuration in cross section. The shortest and forwardly disposed member of the clip defines a head support leg 72 to which is detachably secured a head support bracket 73. A second alignment leg 74 of the mounting clip 70 extends the head support leg 72 and displays a T-shaped configuration defining two pin guide positioning ears 75 and 76. The downwardly disposed edges of the ears 75 and 76 define a pair of L shaped guide pin alignment surfaces 78 and 80, the major sides of which are parallel. The spacing between the major sides of surfaces 78 and 80 of the head support leg 72 is substantially the same as the spacing between the opposing surfaces of the guide pins 34 and 35. The alignment leg 74 defines two spaced tapped holes 82 which are in alignment with corresponding oversized holes 84 in the head support leg 72. Locking screws 86 are passed through the holes in the head support leg and threaded into the alignment leg 74. Upon tightening, the two legs 72 and 74 are drawn together, thus compressing the rear cradle wall 44 which is sandwiched therebetween. Serving to increase the compressability of the clip 70, both the support leg 72 and the alignment leg 74 are notched as at 87 (FIGS. 3 and 4). Additionally, a second set of holes 88 are drilled and tapped into the head support leg 72 of the head alignment clip 70 into which suitable fasteners 89 are threaded securing the playback-record head support bracket 73 to the leg 72. The P/R bracket 73 includes a bifurcated retaining tab 92, the prongs of which define a screw retaining slot. Additionally, the bracket 73 includes a second retaining tab 94 defining a circular opening. The screw fasteners 89 are positioned between the fingers of the bifurcated tab 92 and through the opening in the tab 94 and threaded into the cooperating tapped holes 88 defined by the head support leg 72 of the head alignment clip 70. It will be appreciated that this configuration provides a degree of adjustment between the clip 70 and the bracket 73. Additionally, the bracket 73 is formed to define a playback-record head clasp 98 which includes a pair of resilient side members 100, 102, the ends of which are inwardly bent in opposing registration so as to form a tension clasp gripping the playback-record head 20 placed therebetween. The upwardly disposed edge of the member 102 defines a ladder-like structure including two upwardly projecting tape guide tangs 104 which are positioned adjacent the playback-record head 20 and serve to guide the tape carried in a cassette as it is drawn across the playback-record head 20. The playback-record head is positioned in the head clasp 90 and securely retained therein by means of adhesive or lacquer.

Operation

The playback-record head 20 is carefully oriented on the clip 70 during manufacture with necessary alignment instruments and skilled personnel being readily available. In this connection, the bracket 90 is secured to the support leg 72 of the alignment clip 70 with the P/R head located in the clasp. The distances from the surface of the P/R head to the alignment surfaces 78 of the clip 70 is adjusted by sliding the bracket 90 with respect to the clip 70 until it corresponds to the dimensions of a conventional cassette 14 with respect to the distance between the guide pin apertures 36 of the cassette and the location of the tape playback-record station 24 of the cassette. The placement of the head 20 upon the clip 70 is accomplished during manufacture with all necessary alignment fixtures, instruments and skilled personnel being readily available.

The clip 70 is assembled during manufacture as illustrated in FIG. 3 and shipped to the ultimate consumer for replacement installation in this configuration. Upon receipt the user removes the defective head alignment clip, together with the head and pivots the cradle 12 into the loading (phantom) position of FIG. 5. The new playback-record head assembly is slid in place over the lower edge of the rear cradle wall 44 so that the rear wall 44 of the cradle slides in the bits of the clip 70 between the two legs 72 and 74 thereof. The lower edge of the wall 44 defines two parallel upwardly extending slots 106 into which the fasteners 86 are received. Thereafter, the cradle is swung back to its operating position of FIG. 5 and the clip is then dropped until the minor sides of the L shaped alignment surfaces 78 and 80 rest upon the guide pins 34 and 35. In this position, the retaining screws 86 are tightened until the two legs 72 and 74 of the head alignment clip 70 are squeezed together tightly embracing the rear wall 44 of the cradle 12. In this manner, the clip is securely fastened to the cradle wall 44 and accurately located with respect to the guide pins 34 and 35. After alignment, the electrical connections are made to the contact pins 108 provided on the playback-record head by means of a suitable plug, (not shown). As previously mentioned, when the cassette 14 is impaled upon the guide pins 34 and 35, the tape carried therein is accurately located with respect to the guide pins. Since the head 20 is also accurately located with respect to the guide pins 34 and 35 the head is also aligned with the playback-record station 24 of the cassette as illustrated in FIG. 12. The described clip 70 and record-playback head 20 configuration provide a rapid means for field installation of the head 20 without requiring sophisticated instrumentation or skilled personnel.

While this invention has been particularly shown and described in connection with an illustrated embodiment, it will be appreciated that various changes in form and detail may be made without departing from the spirit and scope of the invention as set forth in the following claims.

What is claimed is:

1. An apparatus for accurately positioning a record-playback head with respect to an informational-tape carried within a tape cassette positioned on a cassette recorder comprising:
    a pair of spacially oriented axially parallel cassette guide pins which serve to accurately locate the cassette in the recorder;
    a support member including means for mounting the playback-record head in a fixed, predetermined position thereon;
    said support member including means defining a pair of reference surfaces each being engaged with one of said cassette guide pins so that said mounting means is oriented with respect to said guide pins and thus a playback-record head carried thereon will be oriented with respect to the informational tape carried within the cassette; means mounting said cradle for pivotal movement;
    said cradle including a substantially planar wall with the plane thereof substantially parallel to the plane of a cassette received therein and
    means securing said support member to said wall of said cradle.

2. The apparatus of claim 1 wherein said cradle wall includes at least one opening positioned to allow said guide pins to pass therethrough into the cavity defined by said cradle as the cradle is pivoted between a first loading position whereat said cradle and reference surfaces are out of engagement with said pins and a second operating position whereat said reference surfaces are engaged with said guide pins;
    a portion of said support member being folded thereby defining two substantially parallel legs, the facing surfaces of the legs of said folded support member being spaced to engage opposing faces of said rear cradle wall; and
    means for adjusting the spacing of said parallel legs of said folded support member so that the opposing surfaces of said parallel legs may be brought into selective compressive contact with the rear wall of the cradle so as to sandwich the rear wall between the facing surface of said legs.

3. The apparatus of claim 2 wherein one of said legs of said folded support member defines a pair of oppositely projecting ears which define said reference surfaces, each of said reference surfaces engages one of said pins thereby serving to orient said support member with respect to the guide pins.

4. The apparatus of claim 3 wherein said support member includes a bracket having a shape for embracing a playback-record head, said bracket including means for relatively positioning said bracket with respect to said reference surfaces.

5. An apparatus for mounting a playback-record head upon a cassette recorder having at least one guide pin to accurately locate a cassette in the recorder comprising:
- a support member including means for securely retaining a playback-record head in a fixed, predetermined position thereon;
- said support member including means defining at least one alignment surface for engagement with said guide pin and
- said support member being folded thereby defining a bite having two parallel legs and means for adjusting, the spacing of the facing surfaces of said legs to compressively embrace a portion of the recorder for securing the support member to the recorder.

6. The apparatus of claim 5 wherein the recorder has two guide pins and said alignment means include two alignment surfaces for cooperation with the guide pins.

7. A method for orienting a record-playback head carried on a folded clip defining a pair of generally flat parallel legs with respect to a cassette recorder having at least one guide pin for locating the cassette, and a pivotably mounted cradle for supporting a cassette, the cradle including a rear wall defining an opening therein, one leg of said clip defining at least one alignment surface, comprising the steps of:
- sliding the bite defined by said clip over the rear wall of the pivotably mounted cradle;
- pivoting the cradle to cause the guide pin to pass through the opening in the rear wall of the cradle;
- sliding the clip on the rear cradle wall until the alignment surface rests on the guide pin; and
- securing the folded clip to the rear wall of the cradle by reducing the size of the bite defined by said clip legs.

* * * * *